(12) United States Patent
Koivisto et al.

(10) Patent No.: US 8,897,254 B2
(45) Date of Patent: Nov. 25, 2014

(54) APPARATUS, METHOD AND COMPUTER PROGRAM PRODUCT FOR SELECTING BEAM GROUP AND SUBSET OF BEAMS IN COMMUNICATION SYSTEM

(75) Inventors: Tommi Koivisto, Espoo (FI); Timo Roman, Espoo (FI); Mihai Enescu, Espoo (FI); Shuang Tan, Beijing (CN); Helka-Liina Määttänen, Helsinki (FI)

(73) Assignee: Nokia Corporation, Espoo (FI)

( * ) Notice: Subject to any disclaimer, the term of this patent is extended or adjusted under 35 U.S.C. 154(b) by 83 days.

(21) Appl. No.: 13/698,419

(22) PCT Filed: Jun. 2, 2010

(86) PCT No.: PCT/CN2010/073463
§ 371 (c)(1),
(2), (4) Date: Nov. 16, 2012

(87) PCT Pub. No.: WO2011/150559
PCT Pub. Date: Dec. 8, 2011

(65) Prior Publication Data
US 2013/0064129 A1  Mar. 14, 2013

(30) Foreign Application Priority Data
Jun. 1, 2010 (WO) ............... PCT/CN2010/073411

(51) Int. Cl.
*H04B 7/06* (2006.01)
(52) U.S. Cl.
CPC ............ *H04B 7/0621* (2013.01); *H04B 7/0636* (2013.01)
USPC ........ 370/330; 370/465; 455/562.1; 455/450; 375/299

(58) Field of Classification Search
USPC ......... 370/260, 267, 295, 299, 328–330, 252, 370/431, 464, 465; 455/450–452.2, 561, 455/562.1, 101
See application file for complete search history.

(56) References Cited

U.S. PATENT DOCUMENTS

2008/0188190 A1  8/2008  Prasad et al.
(Continued)

FOREIGN PATENT DOCUMENTS

CN          101459461 A       6/2009
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, v8.7.0, Dec. 2008, pp. 1-144.
(Continued)

*Primary Examiner* — Kerri Rose
(74) *Attorney, Agent, or Firm* — Nokia Corporation

(57) ABSTRACT

An apparatus and method for selecting a beam group and a subset of beams in a communication system are disclosed. The method includes: measuring channel state information (CSI) on a downlink from a base station (920); identifying a selected beam group out of a set of beam groups according to a wideband property of the CSI (930); identifying a selected subset of beams in the selected beam group according to at least one subband (940). Wherein the characteristic of the set of beam groups depends on a transmission rank and the number of beams in the selected subset of beams is equal to the transmission rank. The method further includes: generating encoded feedback information identifying the selected beam group and the selected subset of beams for each subband in a double codebook format (950), transmitting the encoded feedback information to the base station. A computer program product comprising the computer program code which is configured to cause the apparatus to implement above operations is also disclosed.

18 Claims, 9 Drawing Sheets

(56) References Cited

U.S. PATENT DOCUMENTS

| | | | |
|---|---|---|---|
| 2008/0242332 A1 | 10/2008 | Suh et al. | |
| 2008/0298482 A1* | 12/2008 | Rensburg et al. | 375/260 |
| 2009/0080504 A1* | 3/2009 | Li et al. | 375/220 |
| 2009/0147728 A1 | 6/2009 | Atia et al. | |
| 2009/0196272 A1* | 8/2009 | Tsutsui | 370/342 |
| 2009/0290563 A1* | 11/2009 | Gu et al. | 370/338 |
| 2012/0213310 A1* | 8/2012 | Ko et al. | 375/295 |

FOREIGN PATENT DOCUMENTS

| | | |
|---|---|---|
| CN | 101636995 A | 1/2010 |
| EP | 2166808 A1 | 3/2010 |
| WO | 2009/061116 A2 | 5/2009 |

OTHER PUBLICATIONS

"3rd Generation Partnership Project; Technical Specification Group Radio Access Network; Radio Resource Control (RRC); Protocol Specification (Release 9)", 3GPP TS 25.331, v9.1.0, Dec. 2009, pp. 1-1759.

"3rd Generation Partnership Project; Technical Specification Group Radio Access Network; Evolved Universal Terrestrial Radio Access (E-UTRA) Radio Resource Control (RRC); Protocol specification (Release 9)", 3GPP TS 36.331, v9.1.0, Dec. 2009, pp. 1-232.

"Way Forward for Rel-10 Feedback Framework", R1-101683, Feb. 26, 2010, 2 pages.

"Refinements of Feedback and Codebook Design", 3GPP TSG-RAN WG1 #61, R1-102630, Agenda Item: 6.3.4, May 10-14, 2010, 11 pages.

"8Tx Codebook Design", 3GPP TSG RAN WG1 61, R1-102823, Agenda Item: 6.3.4, May 10-14, 2010, pp. 1-6.

"Views on the Feedback Framework for Rel. 10", 3GPP TSG RAN WG1 Meeting #61, R1-103026, Agenda Item: 6.3.4, May 10-14, 2010, pp. 1-15.

Office action received for corresponding Russian Patent Application No. 2012151961, dated May 6, 2014, 3 pages of Office Action, No English Language Translation available.

International Search Report and Written Opinion received for corresponding Patent Cooperation Treaty Application No. PCT/CN2010/073463, dated Mar. 10, 2011, 11 pages.

International Search Report and Written Opinion received for corresponding Patent Cooperation Treaty Application No. PCT/CN2010/073411, dated Mar. 10, 2011, 7 pages.

* cited by examiner

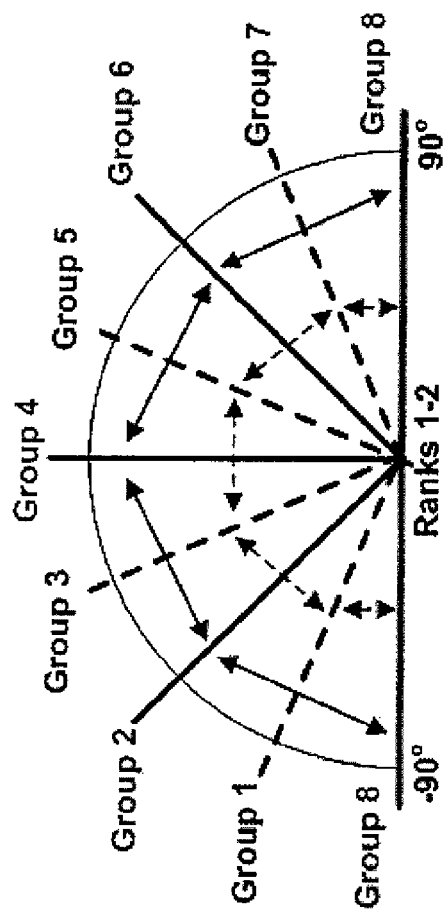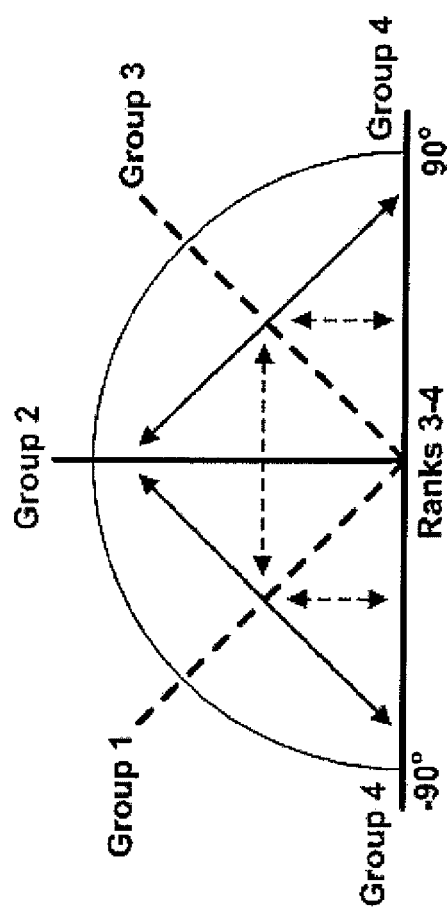
FIGURE 7A
FIGURE 7B

APPARATUS, METHOD AND COMPUTER PROGRAM PRODUCT FOR SELECTING BEAM GROUP AND SUBSET OF BEAMS IN COMMUNICATION SYSTEM

RELATED APPLICATIONS

This application was originally filed as PCT Application No. PCT/CN2010/073463 filed Jun. 2, 2010.

The present invention claims the priority of PCT application PCT/CN2010/073411 filed with SIPO on Jun. 1, 2010, entitled "Apparatus and Method for Selection of Beam Groups and Subset of Beams in a Communication System," the entirety of which is incorporated herein by reference.

TECHNICAL FIELD

The present invention is directed, in general, to communication systems and, in particular, to an apparatus, method and system for selecting a beam group and a subset of beams in a communication system.

BACKGROUND

Long term evolution ("LTE") of the Third Generation Partnership Project ("3GPP"), also referred to as 3GPP LTE, refers to research and development involving the 3GPP LTE Release 8 and beyond, which is the name generally used to describe an ongoing effort across the industry aimed at identifying technologies and capabilities that can improve systems such as the universal mobile telecommunication system ("UMTS"). The notation "LTE-A" is generally used in the industry to refer to further advancements in LTE. The goals of this broadly based project include improving communication efficiency, lowering costs, improving services, making use of new spectrum opportunities, and achieving better integration with other open standards.

The evolved universal terrestrial radio access network ("E-UTRAN") in 3GPP includes base stations providing user plane (including packet data convergence protocol/radio link control/medium access control/physical ("PDCP/RLC/MAC/PHY") sublayers) and control plane (including radio resource control ("RRC") sublayer) protocol terminations towards wireless communication devices such as cellular telephones. A wireless communication device or terminal is generally known as user equipment (also referred to as "UE"). A base station is an entity of a communication network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300 v8.7.0 (2008-12), which is incorporated herein by reference. For details of the radio resource control management, see 3GPP TS 25.331 v.9.1.0 (2009-12) and 3 GPP TS 36.331 v.9.1.0 (2009-12), which are incorporated herein by reference.

As wireless communication systems such as cellular telephone, satellite, and microwave communication systems become widely deployed and continue to attract a growing number of users, there is a pressing need to accommodate a large and variable number of communication devices that transmit an increasing quantity of data within a fixed spectral allocation and limited transmit power. The increased quantity of data is a consequence of wireless communication devices transmitting video information and surfing the Internet as well as performing ordinary voice communication. To address these ongoing needs, a current topic of general interest in 3GPP is the efficient use of spatially multiplexed cellular transmission. The efficient use of spatially multiplexed transmission can enable a higher data rate to be transmitted per hertz ("Hz") of bandwidth at a limited transmit power level, thereby enabling a larger amount of data to be transmitted by a wireless communication device in a shorter period of time, or, equivalently, accommodation of substantially simultaneous operation of a larger number of wireless communication devices.

In order to meet peak spectral efficiency requirements (up to 30 bit(s)/Hz), support of up to eight transmit ("Tx") antennas in a downlink ("DL") will be standardized in 3GPP LTE Rel-10, enabling downlink spatially multiplexed transmission with up to eight spatial layers. Both eight-transmit downlink multi-input/multi-output ("MIMO") and enhanced multi-user multi-input/multi-output ("MU-MIMO") are now agreed to be part of a Rel-10 work item on enhanced downlink MIMO transmission. Such processes will enable the higher data rate to be transmitted with a limited transmitter power level per hertz of bandwidth.

The processes, however, to enable a wireless communication device to communicate channel state and other related information back to a base station so that spatially multiplexed transmission in a downlink can be efficiently performed by the base station introduces a number of challenges. One of the more problematic issues is how to how to deal with the increased communication channel dimensionality and degrees of freedom associated with downlink antenna beam formation (also known as transmit precoding) without channel state information reporting burdening the uplink communication channel for the wireless communication device. Another issue is enabling improved single-user multi-input/multi-output ("SU-MIMO") performance with large azimuthal spread in the wireless communication channel at the transmit antenna array. It is generally recognized that coverage for wireless communication devices located at the crossing of beams in the antenna beam space can be poor with present arrangements.

In view of the growing deployment of communication systems such as cellular communication systems and these unresolved issues, it would be beneficial to employ an improved codebook format to enable a wireless communication device to efficiently determine and communicate channel state and antenna beam characteristics to a base station that avoids the deficiencies of the current communication systems.

SUMMARY OF THE INVENTION

These and other problems are generally solved or circumvented, and technical advantages are generally achieved, by embodiments of the present invention, which include an apparatus, method and system for selecting a beam group and a subset of beams in a communication system. In one embodiment, an apparatus includes a processor and memory including computer program code. The memory and the computer program code are configured to, with the processor, cause the apparatus to measure channel state information on a downlink from a base station, and identify a selected beam group out of a set of beam groups according to a wideband property of the channel state information. The characteristic of the set of beam groups depends on a transmission rank. The memory and the computer program code are further configured to, with the processor, cause the apparatus to identify a selected subset of beams in the selected beam group according to at least one subband. The number of beams in the selected subset of beams is equal to the transmission rank.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which:

FIGS. 6A, 6B, 7A and 7B illustrate graphical representations of embodiments of forming beam groups according to the principles of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, method and system for determining and communicating channel state and antenna beam characteristics from a wireless communication device such as a user equipment to a base station in a communication system. The apparatus, method and system are applicable, without limitation, to any communication system including existing and future 3GPP technologies (i.e., UMTS, LTE, and its future variants such as 4th generation ("4G") communication systems).

Figure 1:
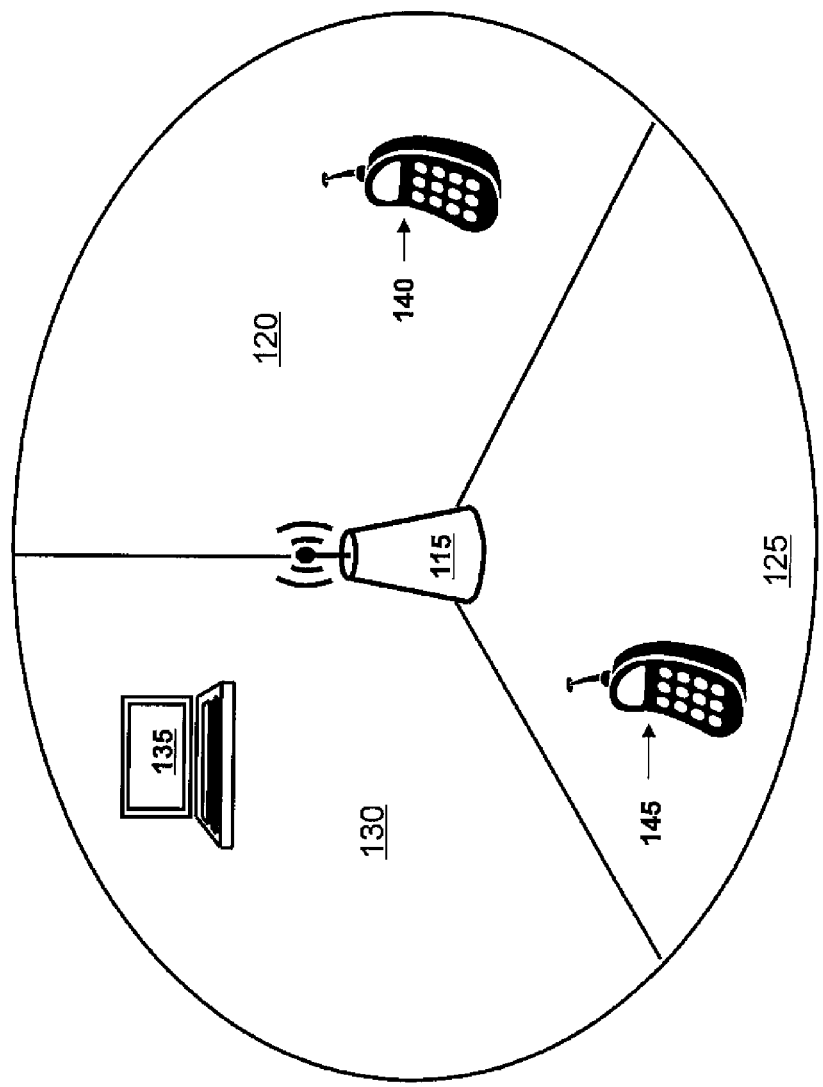
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network (not shown). The base station 115 is configured with a plurality of antennas to transmit and receive signals in a plurality of sectors including a first sector 120, a second sector 125, and a third sector 130, each of which typically spans 120 degrees. Although FIG. 1 illustrates one wireless communication device (e.g., wireless communication device 140) in each sector (e.g. the first sector 120), a sector (e.g. the first sector 120) may generally contain a plurality of wireless communication devices. In an alternative embodiment, a base station 115 may be formed with only one sector (e.g. the first sector 120), and multiple base stations may be constructed to transmit according to co-operative multi-input/multi-output ("C-MIMO") operation, etc.

The sectors (e.g. the first sector 120) are formed by focusing and phasing radiated signals from the base station antennas, and separate antennas may be employed per sector (e.g. the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas. While the wireless communication devices 135, 140, 145 are part of a primary communication system, the wireless communication devices 135, 140, 145 and other devices such as machines (not shown) may be a part of a secondary communication system to participate in, without limitation, device-to-device and machine-to-machine communications or other communications.

Figure 2:
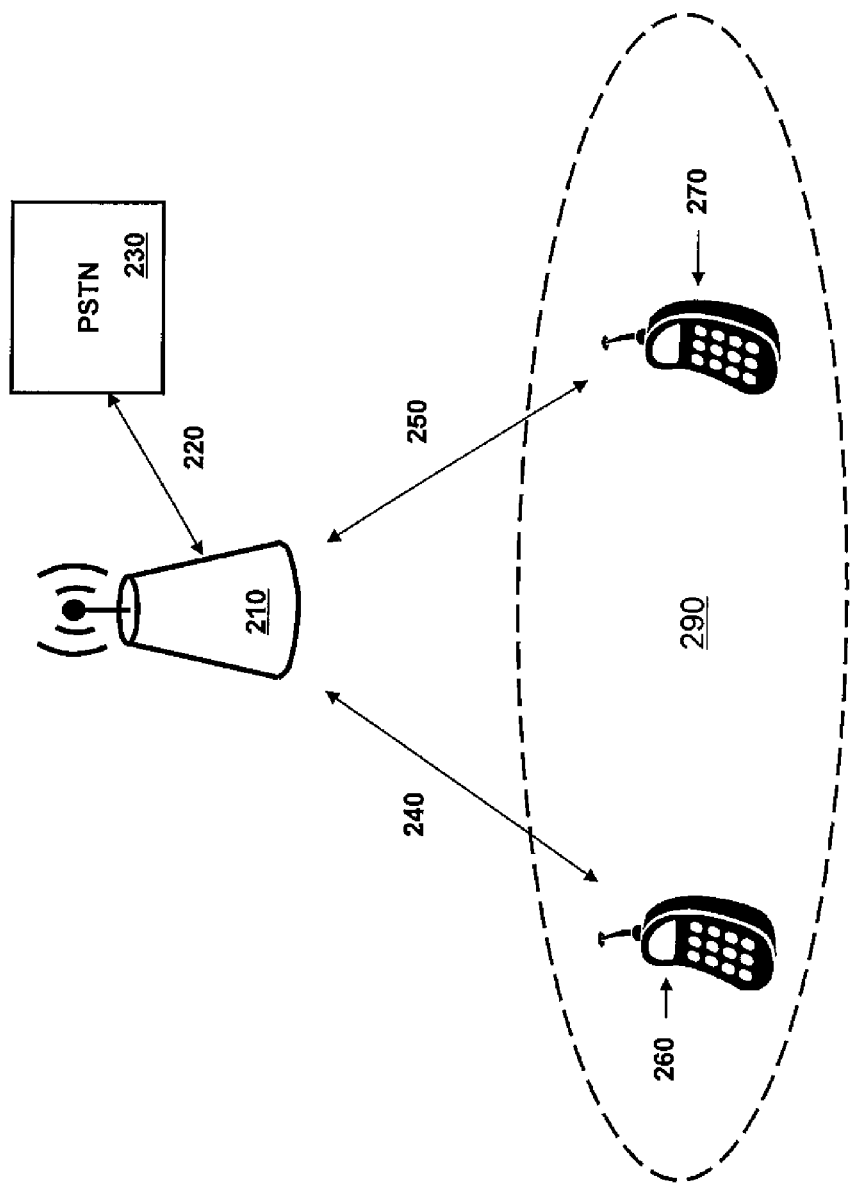

Turning now to FIG. 2, illustrated is a system level diagram of an embodiment of a communication system including a base station 210 and wireless communication devices (e.g., user equipment) 260, 270 that provides an environment for application of the principles of the present invention. The communication system includes the base station 210 coupled by communication path or link 220 (e.g., by a fiber-optic communication path) to a core telecommunications network such as public switched telephone network ("PSTN") 230. The base station 210 is coupled by wireless communication paths or links 240, 250 to the wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes. While the wireless communication devices 260, 270 are part of a primary communication system, the wireless communication devices 260, 270 and other devices such as machines (not shown) may be a part of a secondary communication system to participate in, without limitation, device-to-device and machine-to-machine communications or other communications.

Figure 3:
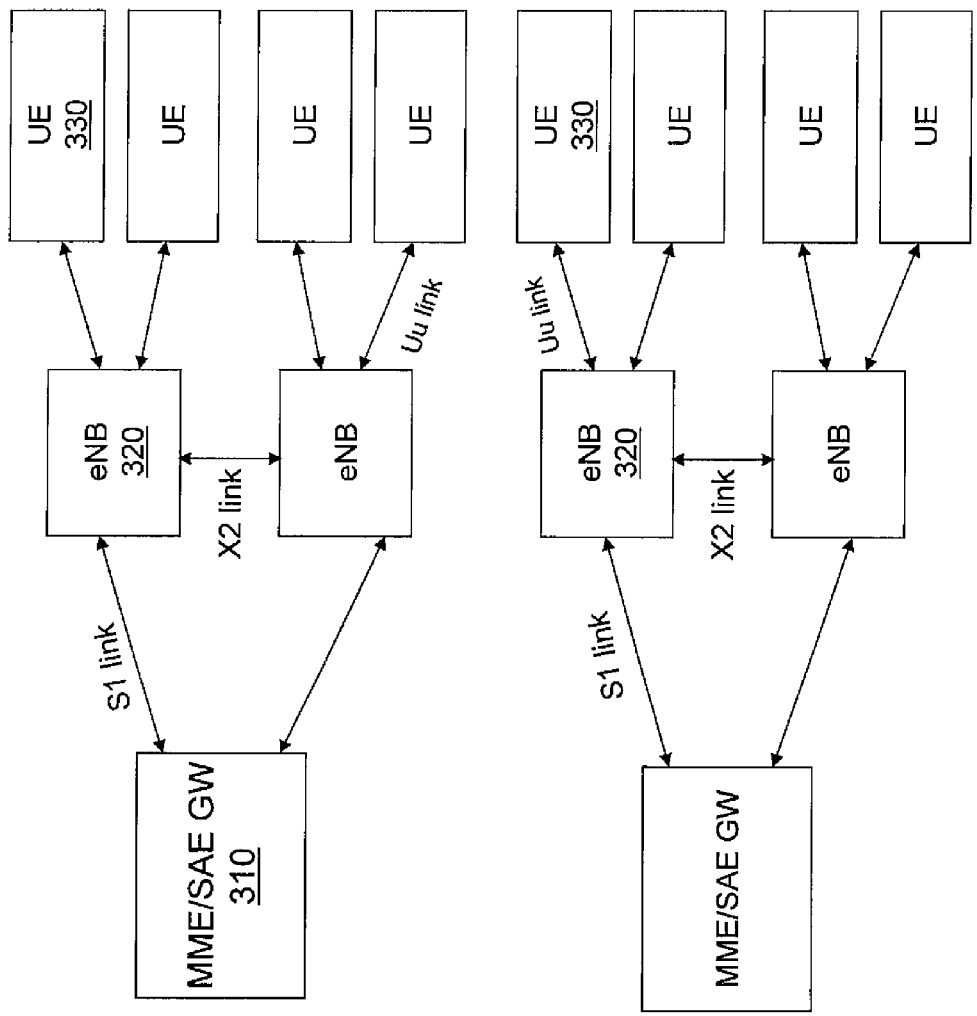
FIGS. 3 and 4 illustrate system level diagrams of embodiments of communication systems including wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," one of which is designated 320) via an S1 communication link (ones of which are designated "S1 link"). The base stations 320 communicate via X2 communication links (ones of which are designated "X2 link"). The various communication links are typically fiber, microwave, or other high-frequency metallic communication paths such as coaxial links, or combinations thereof.

The base stations 320 communicate with wireless communication devices such as user equipment ("UE," ones of which are designated 330), which is typically a mobile transceiver carried by a user. Thus, communication links (designated "Uu" communication links, ones of which are designated "Uu link") coupling the base stations 320 to the user equipment 330 are air links employing a wireless communication signal such as, for example, an orthogonal frequency division multiplex ("OFDM") signal. While the user equipment 330 are part of a primary communication system, the user equipment 330 and other devices such as machines (not shown) may be a part of a secondary communication system to participate in, without limitation, device-to-device and machine-to-machine communications or other communications.

Figure 4:
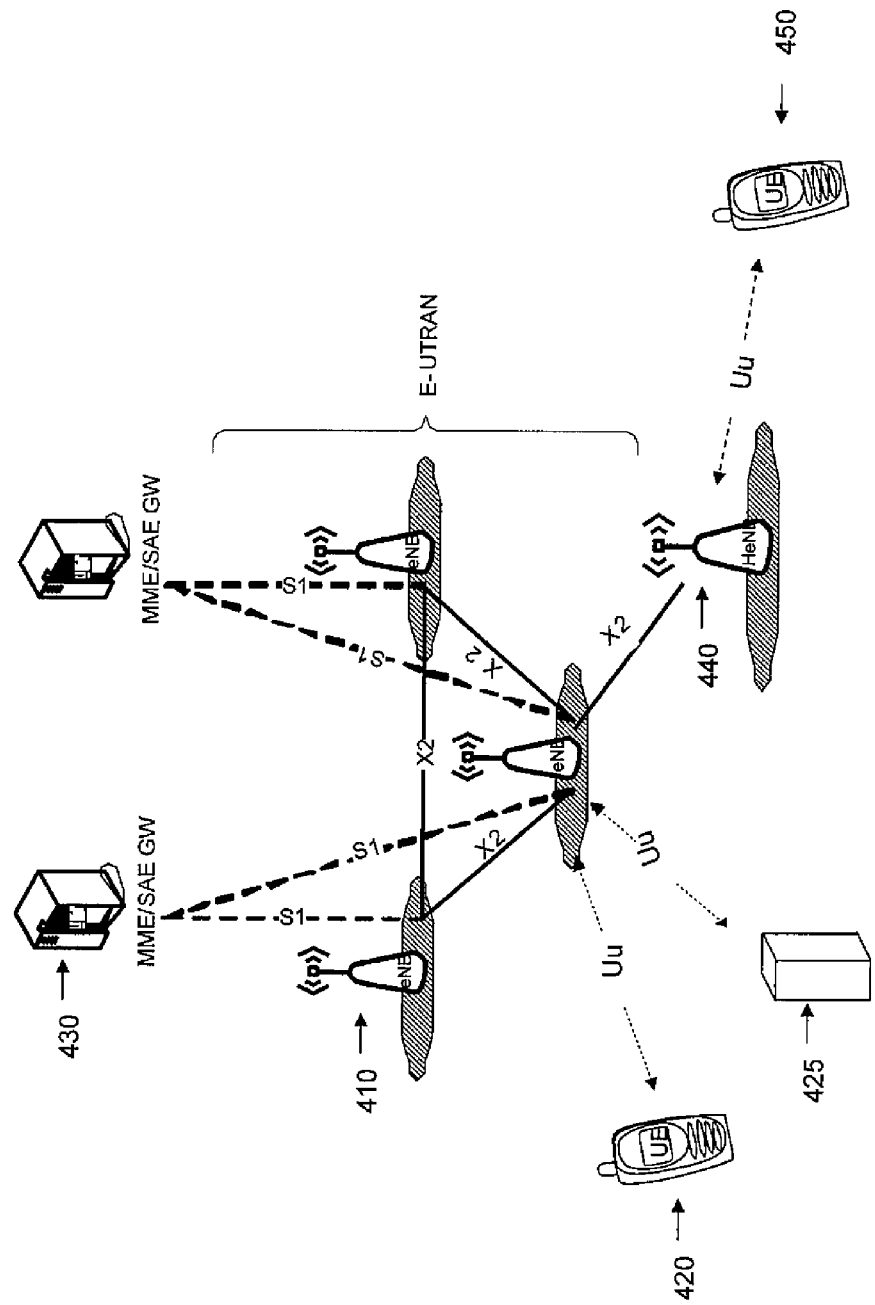

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (packet data convergence protocol/radio link control/media access control/physical) and control plane (radio resource control) protocol terminations towards wireless communication devices such as user equipment 420 and other devices such as machines 425 (e.g., an appliance, television, meter, etc.). The base stations 410 are interconnected with X2 interfaces or communication links (designated "X2"). The base stations 410 are also connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as internet protocol ("IP") header compression and encryption of user data streams, ciphering of user data streams, radio bearer control, radio admission control, connection mobility control, dynamic allocation of communication resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of U-plane packets for paging reasons, switching of U-plane for support of the user equipment mobility, idle state mobility control, and system architecture evolution bearer control. The user equipment 420 and machines 425 receive an allocation of a group of information blocks from the base stations 410.

Additionally, the ones of the base stations 410 are coupled a home base station 440 (a device), which is coupled to devices such as user equipment 450 and/or machines (not shown) for a secondary communication system. The base station 410 can allocate secondary communication system resources directly to the user equipment 420 and machines 425, or to the home base station 440 for communications (e.g., local communications) within the secondary communication system. For a better understanding of home base stations (designated "HeNB"), see 3 GPP TS 32.871 v.9.1.0 (2010-03), which is incorporated herein by reference. While the user equipment 420 and machines 425 are part of a primary communication system, the user equipment 420, machines 425 and home base station 440 (communicating with other user equipment 450 and machines (not shown)) may be a part of a secondary communication system to participate in, without limitation, device-to-device and machine-to-machine communications or other communications.

Figure 5:
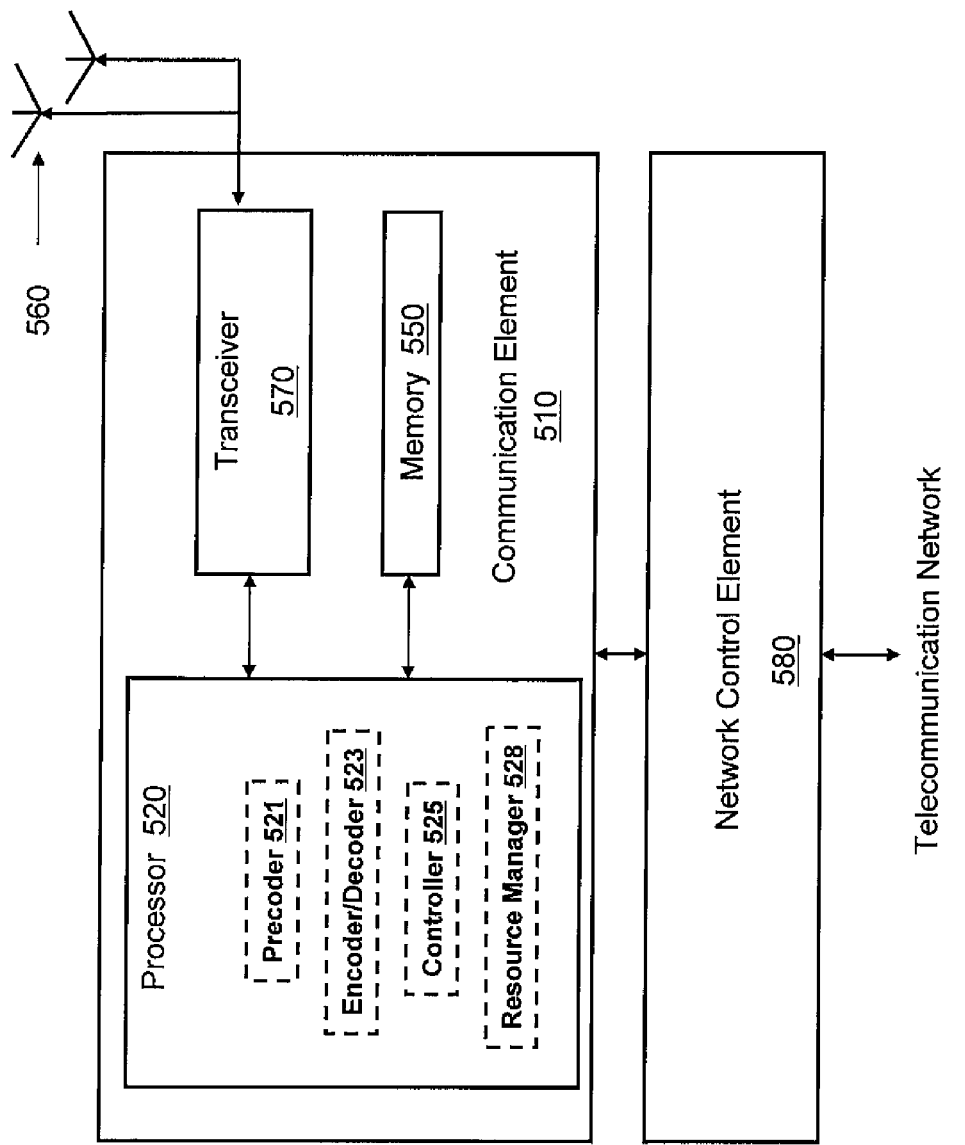
FIG. 5 illustrates a system level diagram of an embodiment of a communication element of a communication system for application of the principles of the present invention.

Turning now to FIG. 5, illustrated is a system level diagram of an embodiment of a communication element 510 of a communication system for application of the principles of the present invention. The communication element or device 510 may represent, without limitation, a base station, a wireless communication device (e.g., a subscriber station, terminal, mobile station, user equipment, machine), a network control element, a communication node, or the like. The communication element 510 includes, at least, a processor 520, memory 550 that stores programs and data of a temporary or more permanent nature, an antenna 560, and a radio frequency transceiver 570 coupled to the antenna 560 and the processor 520 for bidirectional wireless communication. The communication element 510 may provide point-to-point and/or point-to-multipoint communication services.

The communication element 510, such as a base station in a cellular network, may be coupled to a communication network element, such as a network control element 580 of a public switched telecommunication network ("PSTN"). The network control element 580 may, in turn, be formed with a processor, memory, and other electronic elements (not shown). The network control element 580 generally provides access to a telecommunication network such as a PSTN. Access may be provided using fiber optic, coaxial, twisted pair, microwave communication, or similar link coupled to an appropriate link-terminating element. A communication element 510 formed as a wireless communication device is generally a self-contained device intended to be carried by an end user.

The processor 520 in the communication element 510, which may be implemented with one or a plurality of processing devices, performs functions associated with its operation including, without limitation, precoding of antenna gain/phase parameters (precoder 521), encoding and decoding (encoder/decoder 523) of individual bits forming a communication message, formatting of information, and overall control (controller 525) of the communication element, including processes related to management of communication resources (resource manager 528). Exemplary functions related to management of communication resources include, without limitation, hardware installation, traffic management, performance data analysis, tracking of end users and equipment, configuration management, end user administration, management of wireless communication devices, management of tariffs, subscriptions, security, billing and the like. For instance, in accordance with the memory 550, the resource manager 528 is configured to allocate primary and second communication resources (e.g., time and frequency communication resources) for transmission of voice communications and data to/from the communication element 510 and to format messages including the communication resources therefor in a primary and secondary communication system.

The execution of all or portions of particular functions or processes related to management of communication resources may be performed in equipment separate from and/or coupled to the communication element 510, with the results of such functions or processes communicated for execution to the communication element 510. The processor 520 of the communication element 510 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 570 of the communication element 510 modulates information on to a carrier waveform for transmission by the communication element 510 via the antenna(s) 560 to another communication element. The transceiver 570 demodulates information received via the antenna(s) 560 for further processing by other communication elements. The transceiver 570 is capable of supporting duplex operation for the communication element 510.

The memory 550 of the communication element 510, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 550 may include program instructions or computer program code that, when executed by an associated processor, enable the communication element 510 to perform tasks as described herein. Of course, the memory 550 may form a data buffer for data transmitted to and from the communication element 510. Exemplary embodiments of the system, subsystems, and modules as described herein may be implemented, at least in part, by computer software executable by processors of, for instance, the wireless communication device and the base station, or by hardware, or by combinations thereof. As will become more apparent, systems, subsystems and modules may be embodied in the communication element 510 as illustrated and described herein.

Discussion in the 3GPP has recently focused on codebook design for eight base station transmit antennas and related transmit precoding, which is missing from the new LTE Rel-10 standard. In the RAN1 No. 59 meeting, it has been agreed to extend the Rel-8 implicit feedback framework to LTE Rel-10. This is based on a modular (or multi-granular) design, combining two feedback components from separate codebooks representing different characteristics of channel state information. One feedback component targets wideband communication channel properties (also referred to as wideband properties) and/or long-term communication channel properties (also referred to as long-term properties), while the other targets frequency-selective communication channel properties (also referred to as frequency-selective properties) and/or short-term communication channel properties (also referred to as short-term properties). An example of a long-term property is the directional structure of optimal transmit beams. For example, a user equipment's location may not change quickly and, accordingly, its azimuthal direction may be substantially stationary. Accordingly, the directional structure of transmit beams may be represented with a long-term property that happens to be of wideband nature especially in the presence of strong spatial correlation at the transmit antenna array, which is quite likely to be observed under the assumption of closely spaced antenna elements (e.g., spaced by half a wavelength). An example of a short-term property is rapid amplitude and phase fluctuations of the over-the-air communication path. Such rapid fluctuations may be represented with a short-term property, which are typically of frequency selective nature (i.e., vary from one frequency subband to another).

This communication channel feedback structure is also referred to herein as a double codebook structure. While the missing LTE Rel-10 standard specifications are related to one to eight layer transmission in a base station with an eight transmit antenna configuration, the principles of a double codebook structure can be generalized to an arbitrary number of transmit antennas. As introduced herein, a new codebook design and structure for dual codebook-based channel state information ("CSI") feedback in support of downlink SU-/MU-MIMO operation is described for application, without limitation, in LTE Rel-10 and beyond.

The 3GPP LTE downlink MIMO operation is one of several work items under consideration in LTE Rel-10. Two new enhancements to LTE Rel-8/-9 of downlink MIMO are being considered. One enhancement is the optimization of MU-MIMO operation, which benefits from a new reference symbol ("RS") design package that employs precoded user equipment-specific reference symbols (referred in the 3GPP community as UE-RS, or "dedicated reference symbols "DM-RS"), and periodic channel state information reference symbols ("CSI-RS"). A second enhancement is extension of downlink transmit operation up to eight-layer downlink SU-MIMO.

These enhancements serve as support for an enhanced user equipment feedback mode, following the implicit feedback principles from LTE Rel-8. Accurate channel state information feedback plays an important role for reliable, interference-free (or substantially free) communication, especially for MU-MIMO. Moreover, signaling aspects and codebook sizes are important when considering extension to eight-transmit SU-/MU-MIMO operation because of the increased communication channel dimensionality and degrees of freedom therein.

The LTE Rel-10 user equipment feedback design builds on the principles of implicit feedback (channel quality indicator/precoding matrix indicator/rank indicator), similar to LTE Rel-8, but with the difference that a double codebook format is used instead of a single codebook format. However, the single codebook feedback can still be seen as a special case by setting one of the codebook entries to the identity matrix. The decisions on Rel-10 design date back to 3GPP Workgroup RAN1 No. 59 where in the slide presentation represented in 3GPP document R1-101683 entitled "Way Forward for Rel-10 Feedback Framework," which is incorporated herein by reference, it was described that a precoder for a subband is composed of two matrices belonging to distinct codebooks. One codebook targets wideband communication channel properties and/or long-term properties, the matrix therefor denoted herein as "$W_1$." The other codebook targets frequency-selective and/or short-term properties, the matrix therefor denoted herein as "$W_2$." The resulting precoder for each subband can be constructed, for example, as the matrix multiplication of the two matrices.

In a recent 3GPP RAN1 meeting, several codebook design proposals and ways of utilizing the long-/short-term properties were presented. Several key design aspects are included among these proposals: A feedback concept is envisioned to operate with cross-polarized ("XP") and uniform linear array ("ULA") array types of base station antenna setups, and hence the codebooks have to be designed and optimized accordingly. The long- and short-term properties can be sampled with the same or different time periodicities and reported accordingly (at same or different time instances). While considering a relatively fixed total feedback rate budget (i.e., a fixed total number of bits over a given time interval), one may try to find the best balance in investing the feedback bits between the codebooks characterizing the long-term and short-term properties. The final precoder is the output of an operation (e.g., a matrix multiplication) between the long-term and short-term precoders.

The order of wideband/long-term precoder matrix $W_1$ and short-term precoder matrix $W_2$ arrangement in such a product can further differentiate the concepts. If the wideband/long-term properties are handled next to the communication channel (i.e, the channel matrix "H" is multiplied from the right as $H*W_1$), it can be seen as steering the main antenna beams towards the user equipment signal space, while further refinement can enhance either co-phasing (transmission rank-1) or orthogonality (transmission rank>1) among the beams/precoders at a subband level. This can be seen as a $W_1*W_2$ matrix multiplication operation. On the other hand, one can create a larger beam space for matrix $W_1$, which is further refined by the matrix $W_2$ multiplied from the left. The final precoder matrix W is the output of a $W_2*W_1$ matrix multiplication. Arguably these two ways of forming the product of the two codebooks are almost the same. The main difference is how the beams and refinements of the matrices $W_1$ and $W_2$ are defined. A common denominator is the construction of the matrix $W_1$ using (oversampled) discrete Fourier transform ("DFT") vectors or matrices.

The way of selecting the matrices $W_1$ and $W_2$ at the user equipment of the communication channel is also important from a complexity perspective, and this may impact the performance of the scheme itself. For instance, one feedback proposal may perform best under an assumption of an exhaustive search over all possible combinations of wideband/long-term and short-term precoders (matrices $W_1$ and $W_2$), while loosing ground under a more practical and less complex precoder selection. While up to eight spatial layers (or streams) are considered, the double codebook concept is mainly considered attractive for lower transmission ranks, namely transmission ranks 1-2, and perhaps also transmission ranks 3-4, while higher transmission ranks might operate relying only on a single feedback component (e.g., matrix $W_2$ of size Nt times R where Nt and R are the number of transmit antennas at the base station and the transmission rank, respectively), with the other component being conceptually set to the identity matrix (e.g., matrix $W_1$=I of size Nt by Nt).

As presented in the points above, the double codebook concept can be reduced to the definition of beams and beam selection/combining vectors or precoders that are part of the two codebooks. Since the construction of the matrix $W_1$ may employ oversampled discrete Fourier transform matrices/vectors, the designs effectively build on some form of the well-known grid-of-beams concept, where the user equipment effectively chooses one beam (a column of a discrete Fourier transform matrix) that provides best transmission performance.

The Rel-10 feedback concept should support both SU-MIMO and MU-MIMO, where SU-MIMO is typical and offers most performance gains for less correlated scenarios with higher communication channel azimuthal (angular) spread, while MU-MIMO is typical and provides most performance gains for highly correlated scenarios with small azimuthal spread. In a case of higher azimuthal spread and SU-MIMO operation, just selecting one beam (or multiple beams in case of transmission rank>1) for the whole band as in a usual grid of beams is typically not sufficient for good communication performance, because frequency-selective precoding and beam selection at a subband level is known to perform the best in this situation. On the other hand for very low azimuthal spread and MU-MIMO operation, a grid of beams is known to perform well as it is, because in this case wideband and frequency selective precoding achieve very close to same performance, and wideband precoding is more attractive because of much lower associated channel state information feedback overhead. As introduced herein, the traditional grid-of-beams concept is enhanced so that it still supports low azimuthal spread scenarios well, but improves performance of SU-/MU-MIMO operation in scenarios with high azimuthal spread.

Main codebooks structures were introduced during a RAN1 No. 61 meeting in Montreal, Canada, May 10-14, 2010. However, parts of the concepts are even older. One codebook structure is described in 3GPP TSG-RAN WG1 #61 document R1-102630 entitled "Refinements of Feedback and Codebook Design," Montreal, Canada, May 10-14, 2010, which is incorporated herein by reference.

In a first proposal for a codebook structure, the precoder matrix $W_1$ is mainly handled in the wideband sense, compressing the communication channel in the spatial dimension such that the resulting equivalent communication channel matrix $H*W_I$ is of lower dimensionality than the physical transmission communication channel matrix H (e.g., of size Nr by Nt where Nt and Nr are the number of transmit and receive antennas, respectively). Further combining (co-phasing) of the two remaining dimensions (or beams) (for cross-polarized antennas) or orthogonalization between the streams is handled through the matrix $W_2$, which is applied in a frequency selective fashion at a subband level. The precoder matrix $W_1$ is block diagonal, wherein each block includes columns of oversampled discrete Fourier transform matrices. Careful design of both the matrices $W_1$ and $W_2$ can allow supporting both cross-polarized and uniform linear array antenna configuration with the same codebooks. This is achieved by using four bits for the matrix $W_I$ and two bits for the matrix $W_2$. The four bits for the matrix $W_1$ essentially translates into an oversampling factor of four for discrete Fourier transform matrices in the four-antenna transmit case (e.g., corresponding to either four transmit uniform linear array configuration or to each block of four co-polarized transmit antenna elements assuming cross-polarized eight transmit antenna configuration). The entries in the codebook for the matrix $W_2$ consist of the Rel-8 2 transmit antenna codebook, as the concept also addresses transmission rank 1-2 operation in Rel-10. The purpose of the precoder matrix $W_2$ is to handle the cross-polarized combining (co-phasing and orthogonalization) after the $W_1$ matrix structure has been applied to the communication channel, and also to provide support for uniform linear array operation, all $W_2$-matrix based operations being done in a frequency selective manner at a subband level.

Additionally/alternatively, some user equipment feedback reporting modes (e.g., over a physical uplink control channel ("PUCCH")) may be designed under the constraint of very low associated feedback overhead. In the latter case, it would make sense for instance, to consider $W_1$ and $W_2$ matrix selection and reporting both in a wideband fashion. The main difference compared to the usual grid of beams is that the feedback is based on the double codebook format or structure, wherein the format is used to provide a grid of beams-like operation for both uniform linear array and cross-polarized-type of arrays with the same feedback. The issue with this scheme is exactly the one referred to previously hereinabove (i.e., the scheme does not allow improved SU-MIMO performance when azimuthal spread is higher).

In a second proposal, the precoder matrix $W_1$ selects a set of column vectors from the oversampled discrete Fourier transform matrices. For the case of cross-polarized antennas, four antenna beams are created per polarization, while eight beams are used for uniform linear array. Making use of one bit for matrix $W_1$ signaling, the codebook splits the codeword (beam) space into two non-overlapping parts and selects one of them to be further used for refinement or proper beam adjustment at a subband level via the precoder matrix $W_2$. Note that in the one-bit selected space, the beams are pre-defined for further processing; hence the size of the matrix $W_1$ is an 8×16 matrix in the case of eight transmit antennas as there are eight beams defined by one $W_1$ matrix. The codebook structure is described in 3GPP TSG-RAN WG1 #61 document R1-102823 entitled "8 Tx Codebook Design," Montreal, Canada, May 10-14, 2010, which is incorporated herein by reference.

It is also noted that a main difference with the previous proposal was compressing the communication channel in the spatial dimension with the matrix $W_1$. Allowing a larger space (i.e., with full communication channel dimensionality) to be further processed at a subband level with the matrix $W_2$ can be seen as an advantage of one of the concepts, especially in scenarios with larger azimuthal spread and higher transmission rank SU-MIMO transmission. The precoder matrix $W_2$ is signaled with four bits, and the associated codebook consists of combiners and beam selectors.

The freedom of selecting multiple beams per subband, due to the main partitioning operated by the matrix $W_1$ can be seen as an advantage, especially in SU-MIMO case described hereinabove. However this flexibility brings its own disadvantage as the matrix $W_1$ cannot be used well alone since the beam space defined by one matrix $W_1$ is very large. Moreover, due to the two spaces created with the matrix $W_1$, there is poor coverage for the user equipment located at the crossing of the spaces.

In a third proposal, multiple beams are allowed per subband, through the matrix $W_1$. The second precoder matrix $W_2$ refines the matrix $W_1$ by multiplication to the left (i.e., $W_2 * W_1$), thereby performing a rotation of the initial beam. The first codebook (i.e., the one associated with the matrix $W_1$) also contains combiners along the main beams and has a larger size of 32 beams in total, while the second codebook (i.e., the one associated with the matrix $W_2$) may have only 2-3 bits, consisting of several rotation matrices. In fact there are only two inter-pole combiners available for cross-polarized operation, which can be seen as a drawback. A codebook subset restriction for the matrix $W_1$ is also possible. The codebook structure is described in 3GPP TSG-RAN WG1 #61 document R1-103026 entitled "Views on the Feedback Framework for Rel. 10," Montreal, Canada, May 10-14, 2010, which is incorporated herein by reference.

A summary of the main proposed concepts is illustrated in TABLE 1 below:

TABLE 1

| Proposal | # beams | # combiners | $W_1$ | $W_2$ |
|---|---|---|---|---|
| 1 | 16 | 4 | 4-bit beam | 2-bit phase |
| 2 | 8 | 4 | 1-bit beam | 2-bit beam + 2-bit phase |
| 3 | 32 | 2 | 3-bit beam + 1-bit phase | 2-bit phase |

TABLE II below illustrates feedback rates of the main proposed concepts, considering the same time reporting for the matrices $W_1$ and $W_2$ (which affects physical uplink shared channel ("PUSCH") utilization) and 50 physical resource blocks ("PRBs") with six-PRB granularity of the matrix $W_2$ and 10 millisecond ("ms") periodicity for reporting.

TABLE II

| Proposal | $W_1$ (# bits) | $W_2$ (# bits) | # bits for $W_2$ over whole band | # bits in one report | Precoder bit rate |
|---|---|---|---|---|---|
| 1 | 4 | 2 | 18 | 22 | 2200 bps |
| 2 | 1 | 4 | 36 | 37 | 3700 bps |
| 3 | 4 | 3 | 27 | 31 | 3100 bps |

As introduced herein, a codebook structure is described that provides improved support for scenarios with low spatial correlation/high azimuthal spread wherein improved frequency-selective feedback is required for good performance. The codebook format or structure also provides improved support for higher transmission ranks, especially for the case of uniform linear arrays.

The codebook structure is based on similar beam grouping as in the second proposal as described previously hereinabove (i.e., the first part of the feedback signal performs beam group selection and the second part of the feedback signal performs beam selection from the selected beam group). The first part of the feedback applies to the whole band or the wideband properties, whereas the second part of the feedback is sub-band-specific. As a special case, the second part of the feedback can apply as well in a wideband manner. In this special case, it is to be understood that there is a single subband for channel state information feedback, wherein the width is equal to the wideband system bandwidth. To enable beam group selection and beam selection from the selected beam group with the double codebook format or structure, there is a precoder matrix $W_1$ that contains, for example, discrete Fourier transform-based sub-matrices, and precoder matrices $W_2$ that contain column selection vectors and phase shifting such that the actual beams in the beam group are determined by matrix multiplications of the form:

$$W = W_1 * W_2.$$

As introduced herein, groups of beams may overlap. Overlapping groups of beams is intended to cover cases with higher azimuthal spread wherein the enhanced wideband/long-term transmit direction is at the "edges" or in other words at the boundary of two beam groups. Without overlapping of beam groups in such cases, part of the azimuthal spread may not be captured with precoding because it falls in the adjacent beam group. Overlapping typically means that the total angular domain (or angular domain) spanned by the beam groups is overlapping. The angular domain may mean the angular range from the direction of maximum array gain of a first beam to the direction of maximum array gain of a last beam in a beam group or equivalently the maximum possible angular range in terms of direction of maximum array gains between any two beams within the beam group. One special case of such beam group overlap is that the groups of beams partly contain the same beams. In this case, different matrices $W_1$ could be partly constructed from same column vectors.

Secondly, the number of beam groups and/or beam group size (number of beams in the group) and/or beam group total angular domain (angular range spanned by the beam group) depends on the transmission rank. Typical eight-transmit antenna arrays have very closely physically spaced antennas. Since higher transmission ranks employ fairly uncorrelated communication channels, the communication channel azimuthal spread has to be large to allow for higher rank transmission. With the double codebook format or structure, such high azimuthal spread can be captured properly if the beam group size and total angular domain is large enough such that it covers a large range of azimuthal angles. Hence for higher transmission ranks, the beam group size and total angular domain should be made larger. The two aspects thus introduced can be combined. Overlapping groups of beams are constructed, where the size, number, and angular domain of the overlapping groups of beams may vary according to the transmission rank.

As introduced herein in an exemplary embodiment, the description is provided in terms of beam group selected from a set of beam groups and beam subset selection from the selected beam group as well as potentially overlapping beam groups. This can equivalently be translated in terms of matrix/vector description and codebook format or structure. A set of beam groups specific to a transmission rank translates to a set of $W_1$ matrices specific or associated to a transmission rank in the codebook targeting wideband and/or long-term properties. A number of beam groups within a set of beam groups depending on the transmission rank means that the number of $W_1$ matrices in the set of matrices associated to a given rank depends on the rank itself. Beams within a given beam group translate to specific columns vectors within $W_1$ matrices associated to the beam group or equivalently specific columns of the resulting precoder matrix $W=W_1*W_2$. Consequently, a number of beams within a beam group translates to the number of columns within the associated precoder. Overlapping of beam groups within a set of beam groups can be described as precoders (e.g., $W_1$ matrices) associated to a beam group having a subset of column vectors found in other precoder(s) (e.g., other $W_1$ matrix or matrices) associated to other(s) beam group(s) within the set of beam groups. Selecting a subset of beams from the selected beam group translates, for instance, to column selection vectors/matrices (e.g., $W_2$ matrix) that select column subsets from the matrix associated to the selected beam group (e.g., $W_1$ matrix). Additionally, co-phasing or orthogonalization of beams at subband level can be handled with additional vector or matrix precoder components (e.g., $W_2$ consisting of phase shifters in addition to column selection elements).

Hence, user equipment feedback is employed wherein a user equipment first measures the channel state information and then selects the beam group from a set of beam groups according to wideband or long-term channel state information, wherein the size of each beam group (i.e., a number of beams in each beam group of a set of beam groups) and/or the number of beam groups (i.e., a number of beam groups in a set of beam groups) and/or the total angular domain spanned by each beam group (i.e., a total angular domain spanned from a direction of maximum array gain of a first beam to a direction of maximum array gain of a last beam in each beam group in a set of beam groups) depend on the transmission rank and/or wherein the different beam groups are overlapping. In other words, a characteristic of a set of beam groups includes at least one of a number of beams in each beam group of the set of beam groups, a number of beam groups in the set of beam groups, and a total angular domain spanned from a direction of maximum array gain of a first beam to a direction of maximum array gain of a last beam in each beam group in a set of beam groups. For each subband, the user equipment selects a subset of the beams in the selected beam group wherein the subset size is equal to the transmission rank. Additionally the selected subset of beams may consist of beams orthogonal to each other. The user equipment encodes the feedback information into a double codebook or precoder format employing matrices $W_1$ and $W_2$ for transmission on an uplink communication channel, and transmits the double codebook format to the base station.

The base station receives the feedback transmitted on an uplink communication channel, decodes the feedback information, and translates it into a double codebook or precoder format or structure (i.e., into matrices $W_1$ and $W_2$). The base station computes the final precoder (i.e., the antenna weights) to be used for transmission to the user equipment per frequency subband based on the matrices $W_1$ and $W_2$, for example by matrix multiplication as:

$$W=W_1*W_2.$$

When transmitting data to the user equipment, the base station does the antenna weighting on the scheduled subbands according to the weights in the matrix W.

To compute the feedback to the base station, the user equipment first measures channel state information. In case of a LTE-based communication system, this measurement could be done using reference signals, for example the CSI-RS in case of eight transmit antennas, or either CSI-RS in case of four transmit antennas (or fewer). The user equipment then obtains the channel state information for the whole system bandwidth.

Once the user equipment has obtained channel state information, the feedback can be computed (i.e., the user equipment determines the beam group as well as selecting a beam for each subband). With the double codebook format or structure, the user equipment selects a wideband/long-term precoder matrix $W_1$ and a precoder matrix $W_2$ for each subband, conditioned on the chosen precoder matrix $W_1$. In one aspect, the beam group is selected with the matrix $W_1$, while the precoder matrices $W_1$ and $W_2$ together form the final beams (precoders) within each beam group. The final precoders are then constructed employing the matrix multiplication:

$$W=W_1*W_2.$$

Figure 6A:
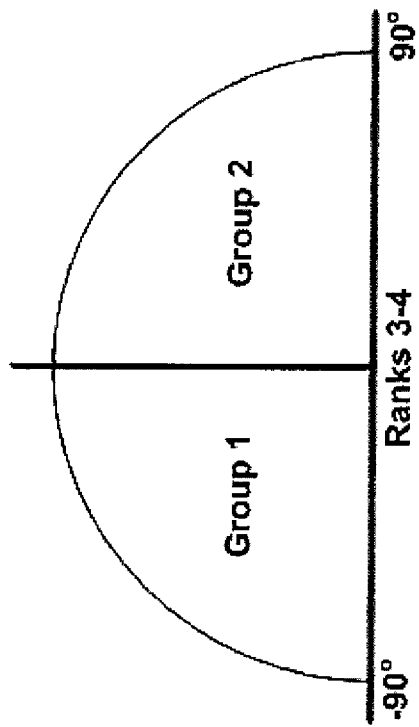
Figure 6B:
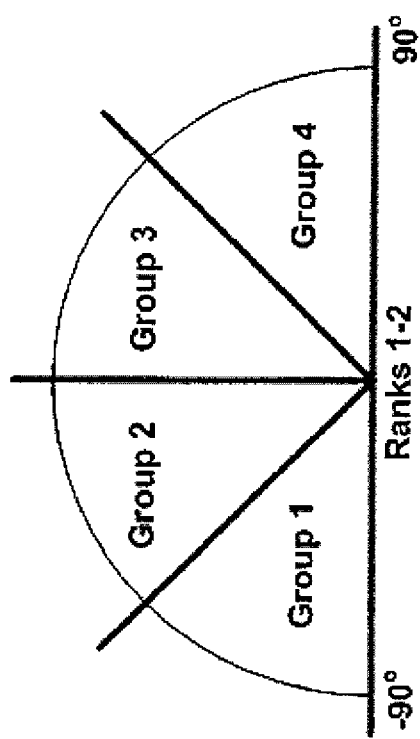

Turning now to FIGS. 6A and 6B, illustrated are graphical representations of embodiments of forming beam groups according to the principles of the present invention. It should be understood that the azimuthal gain characteristic of a particular transmit beam is not flat and precisely limited in angular domain as represented in the FIGUREs. In FIG. 6A, illustrated are four beam groups for the case of transmission ranks 1-2, each beam group including, for example, of four beams. As illustrated in FIG. 6B for transmission ranks 3-4, there are two beam groups, but with larger beam group angular (azimuthal) domain, each group including, for example, of eight beams. The sizes of the beam groups and/or the number of beam groups and/or total angular domain spanned by the beam groups depend on the transmission rank. Exemplary codebook entries for precoder matrices $W_1$, $W_2$ supporting this format or structure are presented below.

Turning now to FIGS. 7A and 7B, illustrated are graphical representations of embodiments of forming beam groups according to the principles of the present invention. In the illustrated embodiment, the beam groups overlap. Note that the number of beam groups, sizes and angular domain spanned by each beam group are transmission rank-dependent. Exemplary codebook entries for such a format or structure are presented below.

Both the base station and the user equipment know the codebook constructed using these principles. The user equipment may select the codebook entries using, for example, the following exemplary matrix selection scheme. First, the user equipment computes the wideband communication channel spatial covariance matrix R:

$$R = E\{H^H H\}$$

where E is the expectation operator and the superscript operator "H" represents the Hermitian operator (i.e., conjugating and transposing the respective matrix). Again, the (unsuperscripted) H represents the communication channel matrix. The user equipment then utilizes, for example, and without limitation, one of the following ways to choose the matrix $W_1$.

In an exemplary method, the user equipment forms all combinations of the matrices, $$W = W_1 * W_2$$

by sweeping (searching) over all possible choices for the matrices $W_1$ and $W_2$. The search can be done over the wideband for the matrix $W_2$, (i.e., over the full system bandwidth) to limit computational complexity. The user equipment then finds the precoder matrix W that reduces (e.g., minimizes) a chordal, Fubini-Study, or projection two-norm distance to V where the matrix S, $$R = USV^H$$

is the singular value decomposition of the matrix R. The matrices U and V are the customary unitary matrices associated with transforming the matrix R into the diagonal matrix S. The precoder matrix $W_1$ is selected as the one corresponding to an enhanced (e.g., optimum) W.

In another exemplary method, the user equipment forms all combinations of the matrices, $$W_1 * W_2$$

by sweeping over all possible choices for the matrices $W_1$ and $W_2$, (e.g., in a wideband sense). The user equipment then finds the precoder matrix W that enhances (e.g., maximizes) capacity (e.g., maximizes the expression):

$$\det\left(I + \frac{1}{\sigma^2} W^H R W\right).$$

The precoded matrix $W_1$ is selected as the one corresponding to an enhanced (e.g., optimum) W.

To reduce complexity in the above methods, the combinations, $$W = W_1 * W_2$$

could be sampled such that, for example, only one beam from each beam group is selected as representative of that beam group, and the selection is done based on that subset of matrices W, the matrix $W_1$ is selected that enhances (e.g., maximizes), $$\det\left(I + \frac{1}{\sigma^2} W_1^H R W_1\right).$$

A second option is to select the matrix $W_1$ that enhances (e.g., maximizes), $$\text{trace}(W_1^H R W_1).$$

Once the wideband/long-term precoder matrix $W_1$ has been selected, the precoder matrices $W_2$ are selected per frequency subband, for example, by finding the precoder matrix $W_2$ that enhances (e.g., maximizes) throughput on a given subband conditioned on the choice of the matrix $W_1$.

Once the user equipment has determined the beam group and the beam selection within that beam group per subband, the user equipment encodes the selections for transmission on an uplink communication channel. Both the matrices $W_1$ and $W_2$ are encoded as indices in codebooks known both by the base station and the user equipment. The user equipment transmits the index of the selected matrix $W_1$ as well as the indices of the selected matrices $W_2$ to the base station (e.g., the double codebook format). In case of an LTE-based communication system, the uplink communication channel used for feedback transmission may be either a physical uplink control channel ("PUCCH") or PUSCH. In case of PUCCH, at least two alternative signaling solutions are envisioned.

In one signaling solution, the index of the matrix $W_1$ may be encoded together with the transmission rank indicator in a first PUCCH report, and index of the matrix $W_2$ may be encoded together with channel quality indicators ("CQI(s)") in another PUCCH report. In another signaling solution, the transmission rank indicator is transmitted separately in a first PUCCH report, and the index of the matrix $W_1$ as well as the index of the matrix $W_2$ and the CQI(s) are transmitted in another PUCCH report. In an exemplary embodiment, data for the matrix $W_1$ as and data for the matrix $W_2$ may be reported with the same frequency, or data for the matrix $W_2$ may be reported with a higher frequency than data for the matrix $W_1$. In case of PUSCH, all information including transmission rank indicator, both codebook indices (e.g., double codebook format) as well as CQI(s) would be transmitted in one PUSCH report. The transmission of PUSCH feedback reports is typically triggered by the base station, as opposed to PUCCH, which happens periodically according to some semi-static configurations.

The base station obtains the final precoder matrix as a result of the matrix multiplication, $$W = W_1 * W_2.$$

As none of the codebook matrices is self-contained, receiving both matrices in one report can be advantageous. However, as the matrix $W_1$ exploits wideband/long-term properties of the communication channel, reporting of the matrix $W_1$ can be made with a lower time periodicity, while the matrix $W_2$ refinement can be sent with a higher time periodicity. Provided that the matrix $W_1$ is fairly constant over time and non-erroneous transmission has been performed, such decoupled signaling can be employed.

An exemplary codebook design for transmission rank-dependent beam groups with transmission rank 1-4 operation is now described. In this exemplary design, there are four beam groups in the case of transmission ranks 1 and 2, and two beam groups spanning a larger beam space in the case of transmission ranks 3 and 4. The four beam groups in the case of transmission ranks 1 and 2 are described with discrete Fourier transform-based block-diagonal matrices as follows.

$$W_1^{(1,2)}(0) = \frac{1}{2}\begin{bmatrix} 1 & 1 & 1 & 1 & 0 & 0 & 0 & 0 \\ 1 & e^{i\frac{\pi}{8}} & e^{i\frac{\pi}{4}} & e^{i\frac{3\pi}{8}} & 0 & 0 & 0 & 0 \\ 1 & e^{i\frac{\pi}{4}} & i & e^{i\frac{3\pi}{4}} & 0 & 0 & 0 & 0 \\ 1 & e^{i\frac{3\pi}{8}} & e^{i\frac{3\pi}{4}} & e^{i\frac{9\pi}{8}} & 0 & 0 & 0 & 0 \\ 0 & 0 & 0 & 0 & 1 & 1 & 1 & 1 \\ 0 & 0 & 0 & 0 & 1 & e^{i\frac{\pi}{8}} & e^{i\frac{\pi}{4}} & e^{i\frac{3\pi}{8}} \\ 0 & 0 & 0 & 0 & 1 & e^{i\frac{\pi}{4}} & i & e^{i\frac{3\pi}{4}} \\ 0 & 0 & 0 & 0 & 1 & e^{i\frac{3\pi}{8}} & e^{i\frac{3\pi}{4}} & e^{i\frac{9\pi}{8}} \end{bmatrix}$$

$$W_1^{(1,2)}(1) = \frac{1}{2}\begin{bmatrix} 1 & 1 & 1 & 1 & 0 & 0 & 0 & 0 \\ i & e^{i\frac{5\pi}{8}} & e^{i\frac{3\pi}{4}} & e^{i\frac{7\pi}{8}} & 0 & 0 & 0 & 0 \\ -1 & e^{i\frac{5\pi}{4}} & -i & e^{i\frac{7\pi}{4}} & 0 & 0 & 0 & 0 \\ -i & e^{i\frac{15\pi}{8}} & e^{i\frac{\pi}{4}} & e^{i\frac{5\pi}{8}} & 0 & 0 & 0 & 0 \\ 0 & 0 & 0 & 0 & 1 & 1 & 1 & 1 \\ 0 & 0 & 0 & 0 & i & e^{i\frac{5\pi}{8}} & e^{i\frac{3\pi}{4}} & e^{i\frac{7\pi}{8}} \\ 0 & 0 & 0 & 0 & -1 & e^{i\frac{5\pi}{4}} & -i & e^{i\frac{7\pi}{4}} \\ 0 & 0 & 0 & 0 & -i & e^{i\frac{15\pi}{8}} & e^{i\frac{\pi}{4}} & e^{i\frac{5\pi}{8}} \end{bmatrix}$$

$$W_1^{(1,2)}(2) = \frac{1}{2}\begin{bmatrix} 1 & 1 & 1 & 1 & 0 & 0 & 0 & 0 \\ -1 & e^{i\frac{9\pi}{8}} & e^{i\frac{5\pi}{4}} & e^{i\frac{11\pi}{8}} & 0 & 0 & 0 & 0 \\ 1 & e^{i\frac{\pi}{4}} & i & e^{i\frac{3\pi}{4}} & 0 & 0 & 0 & 0 \\ -1 & e^{i\frac{11\pi}{8}} & e^{i\frac{7\pi}{4}} & e^{i\frac{\pi}{8}} & 0 & 0 & 0 & 0 \\ 0 & 0 & 0 & 0 & 1 & 1 & 1 & 1 \\ 0 & 0 & 0 & 0 & -1 & e^{i\frac{9\pi}{8}} & e^{i\frac{5\pi}{4}} & e^{i\frac{11\pi}{8}} \\ 0 & 0 & 0 & 0 & 1 & e^{i\frac{\pi}{4}} & i & e^{i\frac{3\pi}{4}} \\ 0 & 0 & 0 & 0 & -1 & e^{i\frac{11\pi}{8}} & e^{i\frac{7\pi}{4}} & e^{i\frac{\pi}{8}} \end{bmatrix}$$

$$W_1^{(1,2)}(3) = \frac{1}{2}\begin{bmatrix} 1 & 1 & 1 & 1 & 0 & 0 & 0 & 0 \\ -i & e^{i\frac{13\pi}{8}} & e^{i\frac{7\pi}{4}} & e^{i\frac{15\pi}{8}} & 0 & 0 & 0 & 0 \\ -1 & e^{i\frac{5\pi}{4}} & -i & e^{i\frac{7\pi}{4}} & 0 & 0 & 0 & 0 \\ i & e^{i\frac{7\pi}{8}} & e^{i\frac{5\pi}{4}} & e^{i\frac{13\pi}{8}} & 0 & 0 & 0 & 0 \\ 0 & 0 & 0 & 0 & 1 & 1 & 1 & 1 \\ 0 & 0 & 0 & 0 & -i & e^{i\frac{13\pi}{8}} & e^{i\frac{7\pi}{4}} & e^{i\frac{15\pi}{8}} \\ 0 & 0 & 0 & 0 & -1 & e^{i\frac{5\pi}{4}} & -i & e^{i\frac{7\pi}{4}} \\ 0 & 0 & 0 & 0 & i & e^{i\frac{7\pi}{8}} & e^{i\frac{5\pi}{4}} & e^{i\frac{13\pi}{8}} \end{bmatrix}$$

The two beam groups in case of transmission ranks 3-4 may be described as follows:

$$W_1^{(3,4)}(n) = \frac{1}{2} \cdot \begin{bmatrix} X(n) & 0 \\ 0 & X(n) \end{bmatrix}, n = 0, 1$$

where $$X(n) = \begin{bmatrix} 1 & 0 & 0 & 0 \\ 0 & (-1)^n & 0 & 0 \\ 0 & 0 & 1 & 0 \\ 0 & 0 & 0 & (-1)^n \end{bmatrix} \begin{bmatrix} 1 & 1 & 1 & \ldots & 1 \\ 1 & e^{j\frac{\pi}{8}} & e^{j(2)\frac{\pi}{8}} & \ldots & e^{j(7)\frac{\pi}{8}} \\ 1 & e^{j(2)\frac{\pi}{8}} & e^{j(2)(2)\frac{\pi}{8}} & \ldots & e^{j(7)(2)\frac{\pi}{8}} \\ 1 & e^{j(3)\frac{\pi}{8}} & e^{j(2)(3)\frac{\pi}{8}} & \ldots & e^{j(7)(3)\frac{\pi}{8}} \end{bmatrix}$$

Corresponding $W_2$ vectors/matrices are composed of beam-selection vectors, multiplied by a complex number to shift the phase of the vectors. These are listed below in Table 3 only for transmission rank-1, but transmission rank-2-4 designs follow similarly by taking transmission rank 2-4 beam selection vectors with proper phase shifting. In TABLE III below, $e_i$ denotes a 4×1 vector that selects the ith beam, for example,

TABLE III

| | $e_2 = [0\ 1\ 0\ 0]^T$ | |
|---|---|---|
| Index | $W_2$ | Applicable to |
| 0 | $1/\sqrt{2}[e_1^T\ e_1^T]^T$ | XP, ULA |
| 1 | $1/\sqrt{2}[e_1^T\ -e_1^T]^T$ | XP |
| 2 | $1/\sqrt{2}[e_1^T\ je_1^T]^T$ | XP |
| 3 | $1/\sqrt{2}[e_1^T\ -je_1^T]^T$ | XP |
| 4 | $1/\sqrt{2}[e_2^T\ e_2^T]^T$ | XP |
| 5 | $1/\sqrt{2}[e_2^T\ -e_2^T]^T$ | XP |
| 6 | $1/\sqrt{2}[e_2^T\ je_2^T]^T$ | XP, ULA |
| 7 | $1/\sqrt{2}[e_2^T\ -je_2^T]^T$ | XP |
| 8 | $1/\sqrt{2}[e_3^T\ e_3^T]^T$ | XP |
| 9 | $1/\sqrt{2}[e_3^T\ -e_3^T]^T$ | XP, ULA |
| 10 | $1/\sqrt{2}[e_3^T\ je_3^T]^T$ | XP |
| 11 | $1/\sqrt{2}[e_3^T\ -je_3^T]^T$ | XP |
| 12 | $1/\sqrt{2}[e_4^T\ e_4^T]^T$ | XP |
| 13 | $1/\sqrt{2}[e_4^T\ -e_4^T]^T$ | XP |
| 14 | $1/\sqrt{2}[e_4^T\ je_4^T]^T$ | XP |
| 15 | $1/\sqrt{2}[e_4^T\ -je_4^T]^T$ | XP, ULA |

An exemplary codebook design for overlapping beam groups for transmission rank 1-2 operation are now described. In this exemplary design, there are eight beam groups that partially overlap. The overlap is visible in the $W_1$ matrices by providing some of the columns the same in two adjacent matrices.

$$W_1^{(1,2)}(0) = \frac{1}{2}\begin{bmatrix} 1 & 1 & 1 & 1 & 0 & 0 & 0 & 0 \\ 1 & e^{i\frac{\pi}{8}} & e^{i\frac{\pi}{4}} & e^{i\frac{3\pi}{8}} & 0 & 0 & 0 & 0 \\ 1 & e^{i\frac{\pi}{4}} & i & e^{i\frac{3\pi}{4}} & 0 & 0 & 0 & 0 \\ 1 & e^{i\frac{3\pi}{8}} & e^{i\frac{3\pi}{4}} & e^{i\frac{9\pi}{8}} & 0 & 0 & 0 & 0 \\ 0 & 0 & 0 & 0 & 1 & 1 & 1 & 1 \\ 0 & 0 & 0 & 0 & 1 & e^{i\frac{\pi}{8}} & e^{i\frac{\pi}{4}} & e^{i\frac{3\pi}{8}} \\ 0 & 0 & 0 & 0 & 1 & e^{i\frac{\pi}{4}} & i & e^{i\frac{3\pi}{4}} \\ 0 & 0 & 0 & 0 & 1 & e^{i\frac{3\pi}{8}} & e^{i\frac{3\pi}{4}} & e^{i\frac{9\pi}{8}} \end{bmatrix}$$

$$W_1^{(1,2)}(1) = \frac{1}{2}\begin{bmatrix} 1 & 1 & 1 & 1 & 0 & 0 & 0 & 0 \\ e^{i\frac{\pi}{4}} & e^{i\frac{3\pi}{8}} & i & e^{i\frac{5\pi}{8}} & 0 & 0 & 0 & 0 \\ i & e^{i\frac{3\pi}{4}} & -1 & e^{i\frac{5\pi}{4}} & 0 & 0 & 0 & 0 \\ e^{i\frac{3\pi}{4}} & e^{i\frac{9\pi}{8}} & -i & e^{i\frac{15\pi}{8}} & 0 & 0 & 0 & 0 \\ 0 & 0 & 0 & 0 & 1 & 1 & 1 & 1 \\ 0 & 0 & 0 & 0 & e^{i\frac{\pi}{4}} & e^{i\frac{3\pi}{8}} & i & e^{i\frac{5\pi}{8}} \\ 0 & 0 & 0 & 0 & i & e^{i\frac{3\pi}{4}} & -1 & e^{i\frac{5\pi}{4}} \\ 0 & 0 & 0 & 0 & e^{i\frac{3\pi}{4}} & e^{i\frac{95\pi}{8}} & -i & e^{i\frac{15\pi}{8}} \end{bmatrix}$$

$$W_1^{(1,2)}(2) = \frac{1}{2}\begin{bmatrix} 1 & 1 & 1 & 1 & 0 & 0 & 0 & 0 \\ i & e^{i\frac{5\pi}{8}} & e^{i\frac{3\pi}{4}} & e^{i\frac{7\pi}{8}} & 0 & 0 & 0 & 0 \\ -1 & e^{i\frac{5\pi}{4}} & -i & e^{i\frac{7\pi}{4}} & 0 & 0 & 0 & 0 \\ -i & e^{i\frac{15\pi}{8}} & e^{i\frac{\pi}{4}} & e^{i\frac{5\pi}{8}} & 0 & 0 & 0 & 0 \\ 0 & 0 & 0 & 0 & 1 & 1 & 1 & 1 \\ 0 & 0 & 0 & 0 & i & e^{i\frac{5\pi}{8}} & e^{i\frac{3\pi}{4}} & e^{i\frac{7\pi}{8}} \\ 0 & 0 & 0 & 0 & -1 & e^{i\frac{5\pi}{4}} & -i & e^{i\frac{7\pi}{4}} \\ 0 & 0 & 0 & 0 & -i & e^{i\frac{15\pi}{8}} & e^{i\frac{\pi}{4}} & e^{i\frac{5\pi}{8}} \end{bmatrix}$$

$$W_1^{(1,2)}(3) = \frac{1}{2}\begin{bmatrix} 1 & 1 & 1 & 1 & 0 & 0 & 0 & 0 \\ e^{i\frac{3\pi}{4}} & e^{i\frac{7\pi}{8}} & -1 & e^{i\frac{9\pi}{8}} & 0 & 0 & 0 & 0 \\ -i & e^{i\frac{7\pi}{4}} & 1 & e^{i\frac{\pi}{4}} & 0 & 0 & 0 & 0 \\ e^{i\frac{\pi}{4}} & e^{i\frac{5\pi}{8}} & -1 & e^{i\frac{11\pi}{8}} & 0 & 0 & 0 & 0 \\ 0 & 0 & 0 & 0 & 1 & 1 & 1 & 1 \\ 0 & 0 & 0 & 0 & e^{i\frac{3\pi}{4}} & e^{i\frac{7\pi}{8}} & -1 & e^{i\frac{9\pi}{8}} \\ 0 & 0 & 0 & 0 & -i & e^{i\frac{7\pi}{4}} & 1 & e^{i\frac{\pi}{4}} \\ 0 & 0 & 0 & 0 & e^{i\frac{\pi}{4}} & e^{i\frac{5\pi}{8}} & -1 & e^{i\frac{11\pi}{8}} \end{bmatrix}$$

$$W_1^{(1,2)}(4) = \frac{1}{2}\begin{bmatrix} 1 & 1 & 1 & 1 & 0 & 0 & 0 & 0 \\ -1 & e^{i\frac{9\pi}{8}} & e^{i\frac{5\pi}{4}} & e^{i\frac{11\pi}{8}} & 0 & 0 & 0 & 0 \\ 1 & e^{i\frac{\pi}{4}} & i & e^{i\frac{3\pi}{4}} & 0 & 0 & 0 & 0 \\ -1 & e^{i\frac{11\pi}{8}} & e^{i\frac{7\pi}{4}} & e^{i\frac{7\pi}{8}} & 0 & 0 & 0 & 0 \\ 0 & 0 & 0 & 0 & 1 & 1 & 1 & 1 \\ 0 & 0 & 0 & 0 & -1 & e^{i\frac{9\pi}{8}} & e^{i\frac{5\pi}{4}} & e^{i\frac{11\pi}{8}} \\ 0 & 0 & 0 & 0 & 1 & e^{i\frac{\pi}{4}} & i & e^{i\frac{3\pi}{4}} \\ 0 & 0 & 0 & 0 & -1 & e^{i\frac{11\pi}{8}} & e^{i\frac{7\pi}{4}} & e^{i\frac{7\pi}{8}} \end{bmatrix}$$

$$W_1^{(1,2)}(5) = \frac{1}{2}\begin{bmatrix} 1 & 1 & 1 & 1 & 0 & 0 & 0 & 0 \\ e^{i\frac{5\pi}{4}} & e^{i\frac{11\pi}{8}} & -i & e^{i\frac{13\pi}{8}} & 0 & 0 & 0 & 0 \\ -i & e^{i\frac{3\pi}{4}} & -1 & e^{i\frac{5\pi}{4}} & 0 & 0 & 0 & 0 \\ e^{i\frac{7\pi}{4}} & e^{i\frac{\pi}{8}} & i & e^{i\frac{7\pi}{8}} & 0 & 0 & 0 & 0 \\ 0 & 0 & 0 & 0 & 1 & 1 & 1 & 1 \\ 0 & 0 & 0 & 0 & e^{i\frac{5\pi}{4}} & e^{i\frac{11\pi}{8}} & -i & e^{i\frac{13\pi}{8}} \\ 0 & 0 & 0 & 0 & -i & e^{i\frac{3\pi}{4}} & -1 & e^{i\frac{5\pi}{4}} \\ 0 & 0 & 0 & 0 & e^{i\frac{7\pi}{4}} & e^{i\frac{\pi}{8}} & i & e^{i\frac{7\pi}{8}} \end{bmatrix}$$

$$W_1^{(1,2)}(6) = \frac{1}{2}\begin{bmatrix} 1 & 1 & 1 & 1 & 0 & 0 & 0 & 0 \\ -i & e^{i\frac{13\pi}{8}} & e^{i\frac{7\pi}{4}} & e^{i\frac{15\pi}{8}} & 0 & 0 & 0 & 0 \\ -1 & e^{i\frac{5\pi}{4}} & i & e^{i\frac{7\pi}{4}} & 0 & 0 & 0 & 0 \\ i & e^{i\frac{7\pi}{8}} & e^{i\frac{5\pi}{4}} & e^{i\frac{13\pi}{8}} & 0 & 0 & 0 & 0 \\ 0 & 0 & 0 & 0 & 1 & 1 & 1 & 1 \\ 0 & 0 & 0 & 0 & -i & e^{i\frac{13\pi}{8}} & e^{i\frac{7\pi}{4}} & e^{i\frac{15\pi}{8}} \\ 0 & 0 & 0 & 0 & -1 & e^{i\frac{5\pi}{4}} & i & e^{i\frac{7\pi}{4}} \\ 0 & 0 & 0 & 0 & i & e^{i\frac{7\pi}{8}} & e^{i\frac{5\pi}{4}} & e^{i\frac{13\pi}{8}} \end{bmatrix}$$

$$W_1^{(1,2)}(7) = \frac{1}{2}\begin{bmatrix} 1 & 1 & 1 & 1 & 0 & 0 & 0 & 0 \\ e^{i\frac{7\pi}{4}} & e^{i\frac{15\pi}{8}} & 1 & e^{i\frac{\pi}{8}} & 0 & 0 & 0 & 0 \\ -i & e^{i\frac{7\pi}{4}} & 1 & e^{i\frac{\pi}{4}} & 0 & 0 & 0 & 0 \\ e^{i\frac{5\pi}{4}} & e^{i\frac{13\pi}{8}} & 1 & e^{i\frac{3\pi}{8}} & 0 & 0 & 0 & 0 \\ 0 & 0 & 0 & 0 & 1 & 1 & 1 & 1 \\ 0 & 0 & 0 & 0 & e^{i\frac{7\pi}{4}} & e^{i\frac{15\pi}{8}} & 1 & e^{i\frac{\pi}{8}} \\ 0 & 0 & 0 & 0 & -i & e^{i\frac{7\pi}{4}} & 1 & e^{i\frac{\pi}{4}} \\ 0 & 0 & 0 & 0 & e^{i\frac{5\pi}{4}} & e^{i\frac{13\pi}{8}} & 1 & e^{i\frac{3\pi}{8}} \end{bmatrix}$$

Corresponding $W_2$ vectors/matrices are similar as in the first exemplary cookbook design (i.e., these matrices are composed of beam selection column vectors).

Thus, improved support of higher azimuthal spread scenarios can be achieved in the case of grid of beams-type of feedback. The whole signal space can be better captured in a frequency selective manner when there is less spatial correlation in the communication channel (i.e., there is a higher azimuthal spread). The benefits of grid of beams for MU-MIMO in highly correlated cases are also retained.

Figure 8:
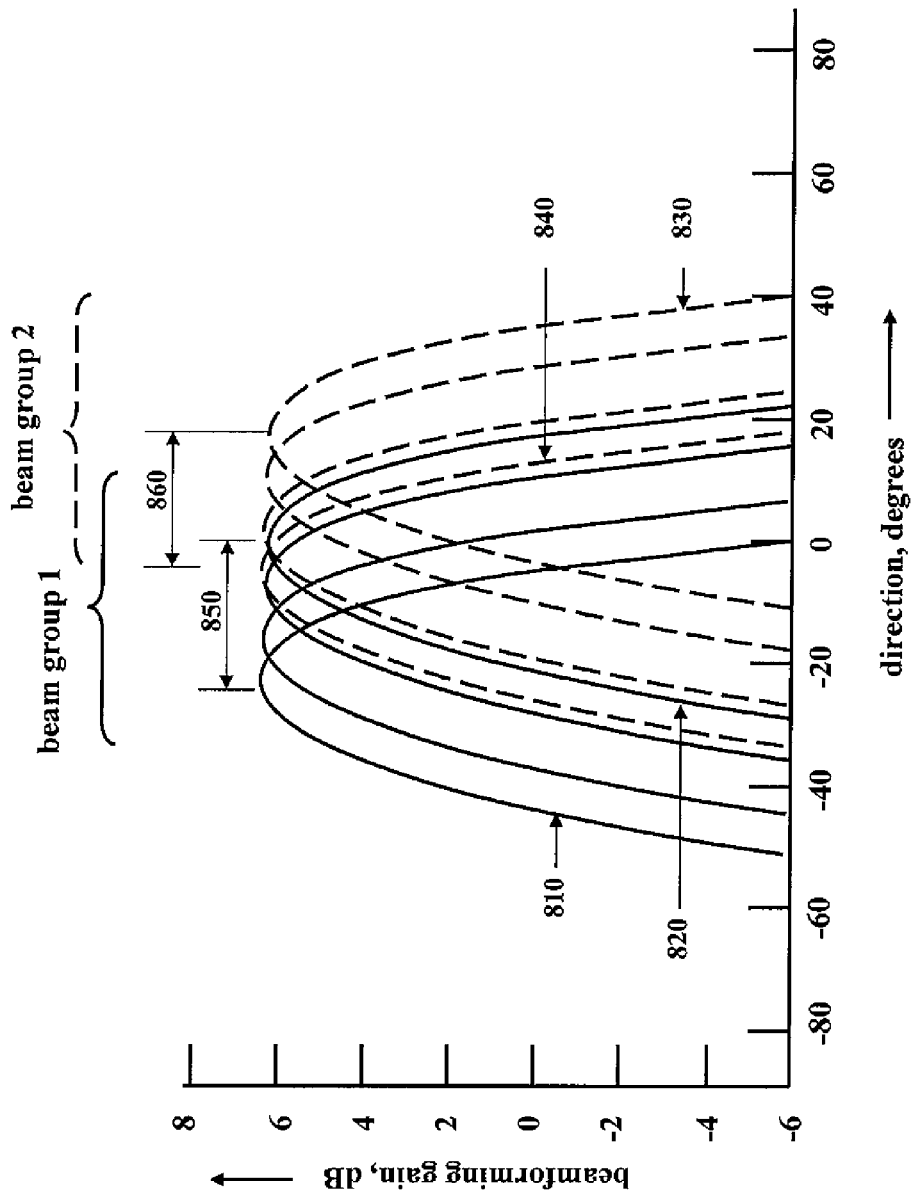
FIG. 8 illustrates a graphical representation of an embodiment of beam groups according to the principles of the present invention.

Turning to FIG. 8, illustrated is a graphical representation of an embodiment of beam groups for the case of transmission ranks 1-2 according to the principles of the present invention. A first beam group (designated beam group 1) includes four beams with a first beam 810 having a maximum gain of six decibels ("dB") in azimuthal direction of zero degrees, and a fourth beam 820 having a maximum gain of six decibels ("dB") in azimuthal direction of minus 22 degrees. A second beam group (designated beam group 2) includes four beams with a first beam 830 having a maximum gain of six decibels ("dB") in azimuthal direction of 18 degrees, and a fourth beam 840 having a maximum gain of six decibels ("dB") in azimuthal direction of minus 4 degrees. The angular range 850 from a direction of maximum array gain of the first beam 810 to a direction of maximum array gain of the fourth beam (the last beam) 820 in the first beam group is 22 degrees and overlaps in angular domain with an angular range 860 from a direction of maximum array gain of the first beam 830 to a direction of maximum array gain of the fourth beam (a last beam) 840 in the second beam group (an adjacent beam group).

Figure 9:
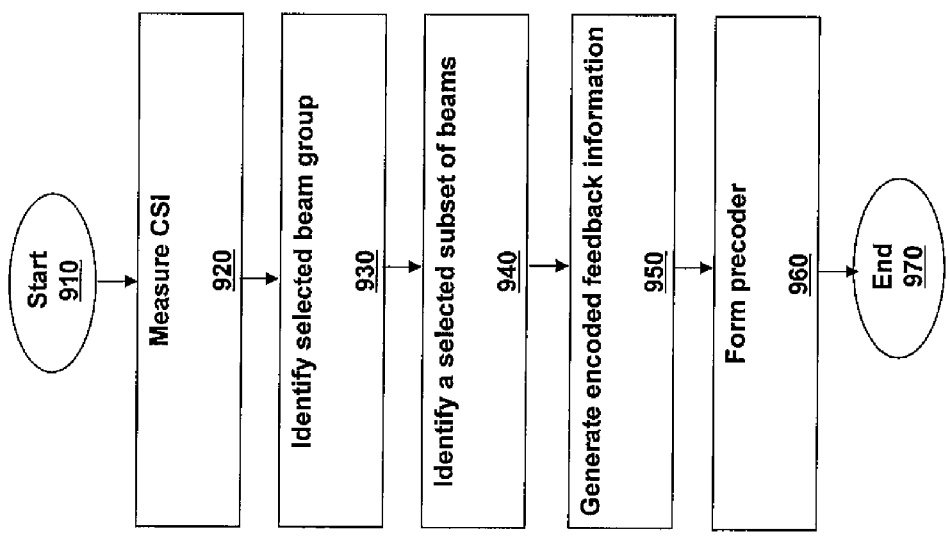
FIG. 9 illustrates a flow diagram of an embodiment of a method of operating a communication system according to the principles of the present invention.

Turning now to FIG. 9, illustrated is a flow diagram of an embodiment of a method of operating a communication system according to the principles of the present invention. Following a start step or module 910, an element of a communication system (e.g., a user equipment and/or base station therein) measures channel state information on a downlink from a base station in a step or module 920. In a step or module 930, a selected beam group out of a set of beam groups is identified according to a wideband property of the channel state information, wherein a characteristic of the set of beam groups depends on a transmission rank. The characteristic of the set of beam groups may be a number of beams in each beam group of the set of beam groups, a number of beam groups in the set of beam groups, and/or a total angular domain spanned from a direction of maximum array gain of a first beam to a direction of maximum array gain of a last beam in each beam group in the set of beam groups. In a step or module 940, a selected subset of beams in the selected beam group is identified according to at least one subband, wherein a number of beams in the selected subset of beams is equal to the transmission rank.

In a step or module 950, encoded feedback information is generated to identify the selected beam group and the selected subset of beams for each subband in a double codebook format. The double codebook format is structured as a first matrix representing the selected beam group and a second matrix representing the selected subset of beams for each subband. The first matrix may be formed employing sets of columns taken from oversampled discrete Fourier transform matrices. Additionally, an angular range from a direction of maximum array gain of a first beam to a direction of maximum array gain of a last beam in the selected beam group may overlap in angular domain with an angular range from a direction of maximum array gain of a first beam to a direction of maximum array gain of a last beam in an adjacent beam group. The selected beam group may be employed to drive eight transmit antennas of a base station. In accordance with the encoded feedback information, a precoder is formed (e.g., in a base station) for transmission of a signal in the communication system using the double codebook format, in a step or module 960. The method ends at step or module 970.

Thus, an apparatus, method and system are introduced herein for selecting a beam group and a subset of beams in a communication system. In one embodiment, an apparatus (e.g., embodied in a user equipment) includes a processor and memory including computer program code. The memory and the computer program code are configured to, with the processor, cause the apparatus to measure channel state information on a downlink from a base station, and identify a selected beam group out of a set of beam groups according to a wideband property of the channel state information. The characteristic of the set of beam groups depends on a transmission rank. The memory and the computer program code are further configured to, with the processor, cause the apparatus to identify a selected subset of beams in the selected beam group according to at least one subband. The number of beams in the selected subset of beams is equal to the transmission rank.

Additionally, the memory and the computer program code are further configured to, with the processor, cause the apparatus to generate encoded feedback information identifying the selected beam group and the selected subset of beams for each subband in a double codebook format, and transmit the encoded feedback information to the base station. The double codebook format includes a first matrix representing the selected beam group and a second matrix representing the selected subset of beams for each subband. The first matrix is formed employing sets of columns taken from oversampled discrete Fourier transform matrices. Also, the characteristic of the set of beam groups includes at least one of a number of beams in each beam group of the set of beam groups, a number of beam groups in the set of beam groups, and a total angular domain spanned from a direction of maximum array gain of a first beam to a direction of maximum array gain of a last beam in each beam group in the set of beam groups. Additionally, a selected beam group may overlap in total angular domain (or angular domain) with an adjacent beam group. For example, an angular range from a direction of maximum array gain of a first beam to a direction of maximum array gain of a last beam in the selected beam group may overlap in angular domain with an angular range from a direction of maximum array gain of a first beam to a direction of maximum array gain of a last beam in an adjacent beam group. Also, the selected beam group may characterize eight transmit antennas.

In another embodiment, an apparatus (e.g., embodied in a base station) includes a processor and memory including computer program code. The memory and the computer program code are configured to, with the processor, cause the apparatus to receive encoded feedback information from a user equipment identifying a selected beam group and a selected subset of beams for at least one subband in a double codebook format. The selected beam group represents one of a set of beam groups according to a wideband property of channel state information measured by the user equipment and a characteristic of the set of beam groups is based on a transmission rank. Also, the selected subset of beams in the selected beam group is selected according to the at least one subband and a number of beams in the selected subset of beams is equal to the transmission rank. The memory and the computer program code are further configured to, with the processor, cause the apparatus to form a precoder for transmission of a signal to the user equipment using the double codebook format. Although the apparatus, method and system described herein have been described with respect to cellular-based communication systems, the apparatus and method are equally applicable to other types of communication systems such as a WiMax® communication system.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   a processor; and
   memory including computer program code;
   said memory and said computer program code configured to, with said processor, cause said apparatus to perform at least the following:
   measure channel state information on a downlink from a base station,
   identify a selected beam group out of a set of beam groups according to a wideband property of said channel state information, wherein a characteristic of said set of beam groups depends on a transmission rank, and
   identify a selected subset of beams in said selected beam group according to at least one subband, wherein a number of beams in said selected subset of beams is equal to said transmission rank;
   wherein an angular range from a direction of maximum array gain of a first beam to a direction of maximum array gain of a last beam in said selected beam group overlaps in angular domain with an angular range from a direction of maximum array gain of a first beam to a direction of maximum array gain of a last beam in an adjacent beam group.

2. The apparatus as recited in claim 1 wherein said memory and said computer program code is further configured to, with said processor, cause said apparatus to perform at least the following:
   generate encoded feedback information identifying said selected beam group and said selected subset of beams for each subband in a double codebook format, and
   transmit said encoded feedback information to said base station.

3. The apparatus as recited in claim 2 wherein said double codebook format comprises a first matrix representing said selected beam group and a second matrix representing said selected subset of beams for each subband.

4. The apparatus as recited in claim 3 wherein said first matrix is formed employing sets of columns taken from oversampled discrete Fourier transform (DFT) matrices.

5. The apparatus as recited in claim 1 wherein said characteristic of said set of beam groups comprises at least one of a number of beams in each beam group of said set of beam groups, a number of beam groups in said set of beam groups, and a total angular domain spanned from a direction of maximum array gain of a first beam to a direction of maximum array gain of a last beam in each beam group in said set of beam groups.

6. A computer program product comprising a program code stored in a non-transitory computer readable medium configured to:
   measure channel state information on a downlink from a base station;
   identify a selected beam group out of a set of beam groups according to a wideband property of said channel state information, wherein a characteristic of said set of beam groups depends on a transmission rank; and
   identify a selected subset of beams in said selected beam group according to at least one subband, wherein a number of beams in said selected subset of beams is equal to said transmission rank; wherein an angular range from a direction of maximum array gain of a first beam to a direction of maximum array gain of a last beam in said selected beam group overlaps in angular domain with an angular range from a direction of maximum array gain of a first beam to a direction of maximum array gain of a last beam in an adjacent beam group.

7. The computer program product as recited in claim 6 wherein said program code stored in said computer readable medium is configured to:
   generate encoded feedback information identifying said selected beam group and said selected subset of beams for each subband in a double codebook format; and
   transmit said encoded feedback information to said base station.

8. A method, comprising:
   measuring channel state information on a downlink from a base station;
   identifying a selected beam group out of a set of beam groups according to a wideband property of said channel state information, wherein a characteristic of said set of beam groups depends on a transmission rank; and
   identifying a selected subset of beams in said selected beam group according to at least one subband, wherein a number of beams in said selected subset of beams is equal to said transmission rank; wherein an angular range from a direction of maximum array gain of a first beam to a direction of maximum array gain of a last beam in said selected beam group overlaps in angular domain with an angular range from a direction of maximum array gain of a first beam to a direction of maximum array gain of a last beam in an adjacent beam group.

9. The method as recited in claim 8, further comprising:
generating encoded feedback information identifying said selected beam group and said selected subset of beams for each subband in a double codebook format; and
transmitting said encoded feedback information to said base station.

10. The method as recited in claim 9 wherein said double codebook format comprises a first matrix representing said selected beam group and a second matrix representing said selected subset of beams for each subband.

11. The method as recited in claim 8 wherein said characteristic of said set of beam groups comprises at least one of a number of beams in each beam group of said set of beam groups, a number of beam groups in said set of beam groups, and a total angular domain spanned from a direction of maximum array gain of a first beam to a direction of maximum array gain of a last beam in each beam group in said set of beam groups.

12. An apparatus, comprising:
a processor; and
memory including computer program code;
said memory and said computer program code configured to, with said processor, cause said apparatus to perform at least the following:
receive encoded feedback information from a user equipment identifying a selected beam group and a selected subset of beams for at least one subband in a double codebook format, wherein said selected beam group represents one of a set of beam groups according to a wideband property of channel state information measured by said user equipment and a characteristic of said set of beam groups based on a transmission rank, and wherein said selected subset of beams in said selected beam group is selected according to said at least one subband and a number of beams in said selected subset of beams is equal to said transmission rank, and form a precoder for transmission of a signal to said user equipment using said double codebook format;
wherein an angular range from a direction of maximum array gain of a first beam to a direction of maximum array gain of a last beam in said selected beam group overlaps in angular domain with an angular range from a direction of maximum array gain of a first beam to a direction of maximum array gain of a last beam in an adjacent beam group.

13. The apparatus as recited in claim 12 wherein said double codebook format comprises a first matrix representing said selected beam group and a second matrix representing said selected subset of beams for each subband.

14. The apparatus as recited in claim 13 wherein said first matrix is formed employing sets of columns taken from oversampled discrete Fourier transform (DFT) matrices.

15. The apparatus as recited in claim 12 wherein said characteristic of said set of beam groups comprises at least one of a number of beams in each beam group of said set of beam groups, a number of beam groups in said set of beam groups, and a total angular domain spanned from a direction of maximum array gain of a first beam to a direction of maximum array gain of a last beam in each beam group in said set of beam groups.

16. The computer program product as recited in claim 7 wherein said double codebook format comprises a first matrix representing said selected beam group and a second matrix representing said selected subset of beams for each subband.

17. The computer program product as recited in claim 16 wherein said first matrix is formed employing sets of columns taken from oversampled discrete Fourier transform (DFT) matrices.

18. The computer program product as recited in claim 6 wherein said characteristic of said set of beam groups comprises at least one of a number of beams in each beam group of said set of beam groups, a number of beam groups in said set of beam groups, and a total angular domain spanned from a direction of maximum array gain of a first beam to a direction of maximum array gain of a last beam in each beam group in said set of beam groups.

* * * * *